US008958904B2

(12) United States Patent
Sakamoto et al.

(10) Patent No.: US 8,958,904 B2
(45) Date of Patent: Feb. 17, 2015

(54) BANKNOTE HANDLING APPARATUS

(71) Applicant: Glory Ltd., Himeji-shi, Hyogo (JP)

(72) Inventors: Masao Sakamoto, Hyogo (JP); Youhei Kamada, Hyogo (JP); Yuya Kataoka, Hyogo (JP); Masao Okamura, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 0 days.

(21) Appl. No.: 14/032,485

(22) Filed: Sep. 20, 2013

(65) Prior Publication Data

US 2014/0039673 A1 Feb. 6, 2014

Related U.S. Application Data

(63) Continuation of application No. PCT/JP2011/001673, filed on Mar. 22, 2011.

(51) Int. Cl.

| | |
|---|---|
| ***G06F 7/00*** | (2006.01) |
| ***G07D 11/00*** | (2006.01) |
| ***G07F 19/00*** | (2006.01) |

(52) U.S. Cl.

CPC ........ *G07D 11/0021* (2013.01); *G07D 11/0081* (2013.01); *G07F 19/209* (2013.01); *G07D 11/0054* (2013.01)

USPC ........... 700/221; 700/220; 700/223; 700/222; 700/224; 700/226; 700/228

(58) Field of Classification Search

CPC ... G07D 7/121; G07D 7/122; G07D 11/0081; G07D 11/0084

See application file for complete search history.

(56) References Cited

U.S. PATENT DOCUMENTS

| | | | | |
|---|---|---|---|---|
| 5,247,159 A * | 9/1993 | Yuge et al. | ..................... | 235/379 |
| 2010/0163571 A1 | 7/2010 | Mizoro | | |
| 2010/0213661 A1 | 8/2010 | Fukazawa et al. | | |

FOREIGN PATENT DOCUMENTS

| | | |
|---|---|---|
| EP | 1 291 831 A2 | 3/2003 |
| EP | 2 234 074 A1 | 9/2010 |
| JP | 4-37983 | 2/1992 |
| JP | 4-199396 | 7/1992 |
| JP | 9-151011 | 6/1997 |
| JP | 11-219468 | 8/1999 |

(Continued)

OTHER PUBLICATIONS

International Search Report (International Application No. PCT/JP2011/001673) (2 pages—dated Apr. 26, 2011).

(Continued)

*Primary Examiner* — Yolanda Cumbess

(74) *Attorney, Agent, or Firm* — Renner, Kenner, Greive, Bobak, Taylor & Weber

(57) ABSTRACT

A banknote handling apparatus includes: a first winding storage unit; a second storage unit; a transport unit; a recognition unit; and a control unit. The first storage unit stores the banknotes, while providing a mark associated with inventory amount information of the first storage unit. To perform a reconciliation process for the first storage unit, the control unit allows some of the banknotes stored in the first storage unit to be fed from the first storage unit, based on the mark, for recognition by the recognition unit, and determines an inventory amount of the first storage unit based on a result of the recognition and the inventory amount information associated with the mark.

6 Claims, 11 Drawing Sheets

(56) References Cited

FOREIGN PATENT DOCUMENTS

| | | | |
|---|---|---|---|
| JP | 2000-123219 | | 4/2000 |
| JP | 2000-339520 | | 12/2000 |
| JP | 2009-9605 | | 1/2009 |
| WO | WO 2008/047094 | A2 | 4/2008 |
| WO | WO 2010/032303 | A1 | 3/2010 |
| WO | WO 2010032303 | A1 * | 3/2010 |

OTHER PUBLICATIONS

European Search Report (Application No. 118615152-PCT/JP2011/001673) (6 pages—dated Sep. 10, 2014).

* cited by examiner

| | DENOMINATION | SERIAL NUMBER |
|---|---|---|
| ⋮ | ⋮ | ⋮ |
| 5 | 10 EURO | A##1 |
| 6 | 10 EURO | C##3 |
| 7 | 10 EURO | B##2 |
| 8 | 10 EURO | E##1 |
| 9 | 10 EURO | C##6 |
| 10 | 10 EURO | B##5 |
| 11 | 10 EURO | A##3 |
| 12 | 10 EURO | D##2 |
| 13 | 10 EURO | D##6 |
| 14 | 10 EURO | B##1 |
| ⋮ | ⋮ | ⋮ |

| | DENOMINATION | TAPE ADDRESS |
|---|---|---|
| ⋮ | ⋮ | ⋮ |
| 5 | 10 EURO | 105 |
| 6 | 10 EURO | — |
| 7 | 10 EURO | — |
| 8 | 10 EURO | — |
| 9 | 10 EURO | — |
| 10 | 10 EURO | 180 |
| 11 | 10 EURO | — |
| 12 | 10 EURO | — |
| 13 | 10 EURO | — |
| 14 | 10 EURO | — |
| ⋮ | ⋮ | ⋮ |

BANKNOTE HANDLING APPARATUS

CROSS-REFERENCE TO RELATED APPLICATIONS

This is a continuation of International Application No. PCT/W2011/001673 filed on Mar. 22, 2011, the entire disclosure of which is incorporated by reference herein.

BACKGROUND

The techniques disclosed herein relate to banknote handling apparatuses which handle banknotes.

Japanese Patent Publication No. H11-219468 discloses a banknote depositing/dispensing machine. The depositing/dispensing machine has a plurality of winding storage units configured to wind and store banknotes and tapes on a reel, and feed the stored banknotes. Each of the winding storage unit stores the banknotes such that the last stored banknote is first fed, and in order to downsize the apparatus, one of the winding storage units which is configured to store largest banknotes also serves as an escrow unit which temporarily holds the banknotes in the depositing/dispensing machine. Thus, the depositing/dispensing machine is configured such that banknotes are wound on the reel with predetermined storage gaps between the banknotes in one transaction, and with gaps larger than the predetermined storage gaps in a period between a transaction and a transaction (the transaction includes temporary holding).

On the other hand, Japanese Patent Publication No. 2000-339520 discloses a banknote depositing/dispensing machine which has a storage unit configured to store banknotes such that first stored banknote is first fed, unlike a winding storage unit.

SUMMARY

Such depositing/dispensing machines as disclosed in Japanese Patent Publication No. H11-219468 and Japanese Patent Publication No. 2000-339520 perform the following operations in a depositing process. That is, banknotes placed in an inlet are fed one by one, and denominations, etc., are recognized by a recognition unit. After that, based on the recognition result, each of the banknotes is stored in corresponding one of the storage units according to the denominations or fitness, based on predetermined storage allocation of the banknotes. In a dispensing process, the necessary number of banknotes of the specified denomination are fed from the storage unit in which the banknotes are stored, and the banknotes are dispensed to an outlet.

In some cases, the banknotes recognized and counted by the recognition unit may be irregularly transported to the storage units in the depositing process. For example, the banknotes may be skewed, may be chained without a predetermined gap therebetween, or may be overlapped. If the banknotes are chained or overlapped during the depositing process, the order of the banknotes being transported is changed, and the banknotes may not be stored in intended storage units. In such a case, the denominations or the numbers of the banknotes stored in the storage units may be uncertain. When the banknotes are chained or overlapped during the dispensing process, as well, the number of banknotes fed from the storage units may be uncertain, and as a result, the number of banknotes stored in the storage units may be uncertain.

When the irregular transport occurs in the depositing process or the dispensing process, a process of determining the denominations and the number of banknotes stored in the storage unit is required. This process is called a reconciliation process. The reconciliation process includes: feeding all the banknotes out of the storage unit; recognizing and counting the fed banknotes by the recognition unit, and returning the banknotes to the storage unit. For example, in the case where the storage units are configured such that the last stored banknote is first fed as disclosed in Japanese Patent Publication No. H11-219468, banknotes fed out of the storage unit as a reconciliation target are once stored in another storage unit before or after the recognition. In the case where the storage units are configured such that the first stored banknote is first fed as disclosed, for example, in Japanese Patent Publication No. 2000-339520, the banknotes circulate between the storage unit and the recognition unit. Thus, the serial number of the banknote which is first fed out of the storage unit after the start of the reconciliation process is recorded as a mark. When this banknote is fed out of the storage unit again, it is determined that all the banknotes stored in the storage unit have been fed out, and the reconciliation process is finished.

However, the reconciliation process takes long time because all the banknotes stored in the storage unit need to be fed out. In particular, in the case where the storage unit has a large storage capacity and accommodates a large number of banknotes, or the reconciliation process need to be performed on a large number of storage units, or in the case of a combination of both, the reconciliation process takes much longer time. In addition, the depositing process and the dispensing process cannot be performed during the reconciliation process. Thus, the longer time the reconciliation process takes, the longer the depositing/dispensing machine cannot be used.

The techniques disclosed herein are thus intended to reduce time necessary for the reconciliation process of the banknote depositing/dispensing machine. An apparatus disclosed herein is a banknote handling apparatus configured to handle banknotes. The banknote handling apparatus includes: a first storage unit configured to store the banknotes by winding the banknotes and a tape on a reel, and feed the stored banknotes; a second storage unit configured to store and feed the banknotes; a transport unit configured to transport the banknotes between the first storage unit and the second storage unit; a recognition unit configured to recognize the banknotes during transport by the transport unit; and a control unit configured to allow the banknotes in the first storage unit to be fed and stored in the second storage unit, and thereafter allow the banknotes stored in the second storage unit to be fed and stored in the first storage unit, and recognized by the recognition unit, in order to perform a reconciliation process for determining an inventory amount in the first storage unit.

When the banknotes are stored in the first storage unit, the control unit allows the banknotes to be provided with a mark associated with inventory amount information of the first storage unit while the banknotes are being stored in the first storage unit, and to perform the reconciliation process, the control unit allows some of the banknotes stored in the first storage unit to be fed from the first storage unit, based on the mark, for recognition by the recognition unit, and determines an inventory amount in the first storage unit based on a result of the recognition and the inventory amount information associated with the mark.

In this configuration, the first storage unit is a winding storage unit configured to store banknotes by winding the banknotes and a tape on a reel. Thus, the first storage unit stores the banknotes such that the last stored banknote is first fed. Further, the first storage unit stores the banknotes, while providing a mark associated with inventory amount information of the first storage unit. Since the mark is associated with the inventory amount information of the first storage unit, the inventory amount information of the first storage unit can be obtained based on the mark. Here, the mark may be provided on each of the banknotes, based on the number of banknotes to be stored in the first storage unit, or may be provided every time the number of stored banknotes has reached a predetermined number. Alternatively, based on a process of storing the banknotes into the first storage unit (which is a depositing process, for example, and may also be called a transaction), the mark may be provided for every transaction, for example, or may be provided for every predetermined number of transactions (i.e., every two or more transactions). Alternatively, in combination of the number of banknotes to be stored and the transactions, the mark may be provided between a transaction and a transaction every time the number of stored banknotes has reached a predetermined number.

The banknote handling apparatus has a second storage unit, independently of the first storage unit. The transport unit is capable of transporting the banknotes between the first storage unit and the second storage unit. The transport unit may transport the banknotes in a back and forth manner, or may transport the banknotes so as to circulate in a loop.

When the banknote handling apparatus performs a reconciliation process for determining an inventory amount in the first storage unit, the banknotes are fed from the first storage unit based on the mark. Thus, not all the banknotes stored in the first storage unit, but some of the banknotes are fed from the first storage unit. While the banknotes are fed from the first storage unit based on the mark, the inventory amount information of the first storage unit after the banknotes are fed can be obtained based on the mark, because the mark is associated with the inventory amount information of the first storage unit. On the other hand, the banknotes fed from the first storage unit are temporarily stored in the second storage unit, and thereafter the stored banknotes are fed from the second storage unit to be stored in the first storage unit again. The recognition unit recognizes the banknotes while the banknotes are transported from the first storage unit to the second storage unit, or oppositely transported from the second storage unit to the first storage unit, thereby obtaining a result of recognition (including a count result) of the fed banknotes. The inventory amount in the first storage unit after the banknotes are stored again in the first storage unit can be determined based on the recognition result and the inventory amount information associated with the mark.

Since the state of how the banknotes are stored using the first winding storage unit is improved as described above, it is possible to perform a reconciliation process on the first storage unit without feeding all the banknotes out from the first storage unit. As a result, time necessary for the reconciliation process is reduced.

The first storage unit may store the banknotes by winding the banknotes on the reel, with a predetermined gap between adjacent ones of the banknotes, and the mark may be provided between transactions in which the banknotes are stored in the first storage unit, and the mark is an interval larger than the predetermined gap.

The interval between a transaction and a transaction, that is, the interval between a banknote and a banknote can be detected based on signals of a detection sensor configured to detect passage of the banknotes. Specifically, when a gap larger than the predetermined gap is detected based on the signals of the detection sensor during feeding of the banknotes from the first storage unit, that position is detected as the interval.

In the reconciliation process, banknotes may be fed from the first storage unit until the intended interval is detected. For example, the banknotes may be fed until the last provided interval is detected. The inventory amount in the first storage unit can be determined based on the inventory amount information of the first storage unit and a result of recognition of the fed banknotes, by feeding the banknotes until the interval is detected as described above, because the interval and the inventory amount information of the first storage unit are associated with each other.

The banknote handling apparatus may further include a reading unit configured to read a unique code provided on each of the banknotes to be stored in the first storage unit, wherein the mark may be the code of the banknote to be stored in the first storage unit. Here, the unique code of a banknote is provided on the banknote and includes a number, a character, a sign, and their equivalent which are provided to identify the banknote, and is not limited to a specific form. For example, the unique code may be a combination of numeric characters and letters, or may be a barcode or a two-dimensional barcode, etc. Examples of the code include a serial number of the banknote. The reading unit configured to read the code may read the code provided on the banknote optically, electrically, or magnetically, according to the form of the code. For example, the serial number printed on a banknote can be optically read. Further, the recognition unit and the reading unit may be integrally formed by making the recognition unit include the functions of the reading unit.

Further, the inventory amount information of the first storage unit and the code may be associated with each other with respect to each of the banknotes, or with respect to a predetermined number of banknotes. Further, the inventory amount information of the first storage unit and the code may be associated with each other in every transaction, e.g., with respect to the banknote which is last stored in the transaction, or the inventory amount information of the first storage unit and the code may be associated in every plurality of transactions. Alternatively, the number of banknotes and the transaction may be combined.

In the reconciliation process in this configuration, the code of the banknote fed from the first storage unit is read, and it is decided whether the code and the inventory amount information are associated with each other. If the code and the inventory amount information are associated with each other, inventory amount information of the first storage unit after the banknotes are fed can be obtained. Thus, the feeding of the banknotes from the first storage unit is stopped. On the other hand, if the code and the inventory amount information are not associated with each other, banknotes are kept being fed until the inventory amount information of the first storage unit can be obtained based on the fed banknotes. In this configuration, as well, the reconciliation process can be performed by feeding some of the banknotes stored in the first storage unit. As a result, time necessary for the reconciliation process is reduced.

The mark may be a position on the tape which is specified by a lengthwise position on the tape in the first storage unit.

In the winding storage unit, the banknotes and a tape are wound on a reel. Thus, each of the banknotes stored in the storage unit and a lengthwise position on the tape are associated with each other. This means that the information about the lengthwise position on the tape can be used as a mark associated with the inventory amount information of the storage unit. The information about the lengthwise position on the tape can be obtained by an output of an encoder configured to detect whether the tape is fed or wound back. The information about the position (i.e., the mark) may be provided for each of the banknotes, or may be provided for a predetermined number of banknotes. Alternatively, the mark may be provided based on the transactions. The number of banknotes and the transaction may be combined.

In the reconciliation process in the above configuration, some of the banknotes are fed from the first storage unit, based on the information about the position on the tape. The inventory amount information of the first storage unit after the feeding of the banknotes can be obtained based on the information about the position on the tape. Thus, as described above, it is possible to perform the reconciliation process on the first storage unit based on the recognition result and the inventory amount information. As a result, time necessary for the reconciliation process is reduced As described above, the time necessary for the reconciliation process can be reduced in the above banknote handling apparatus.

DETAILED DESCRIPTION

Figure 1:
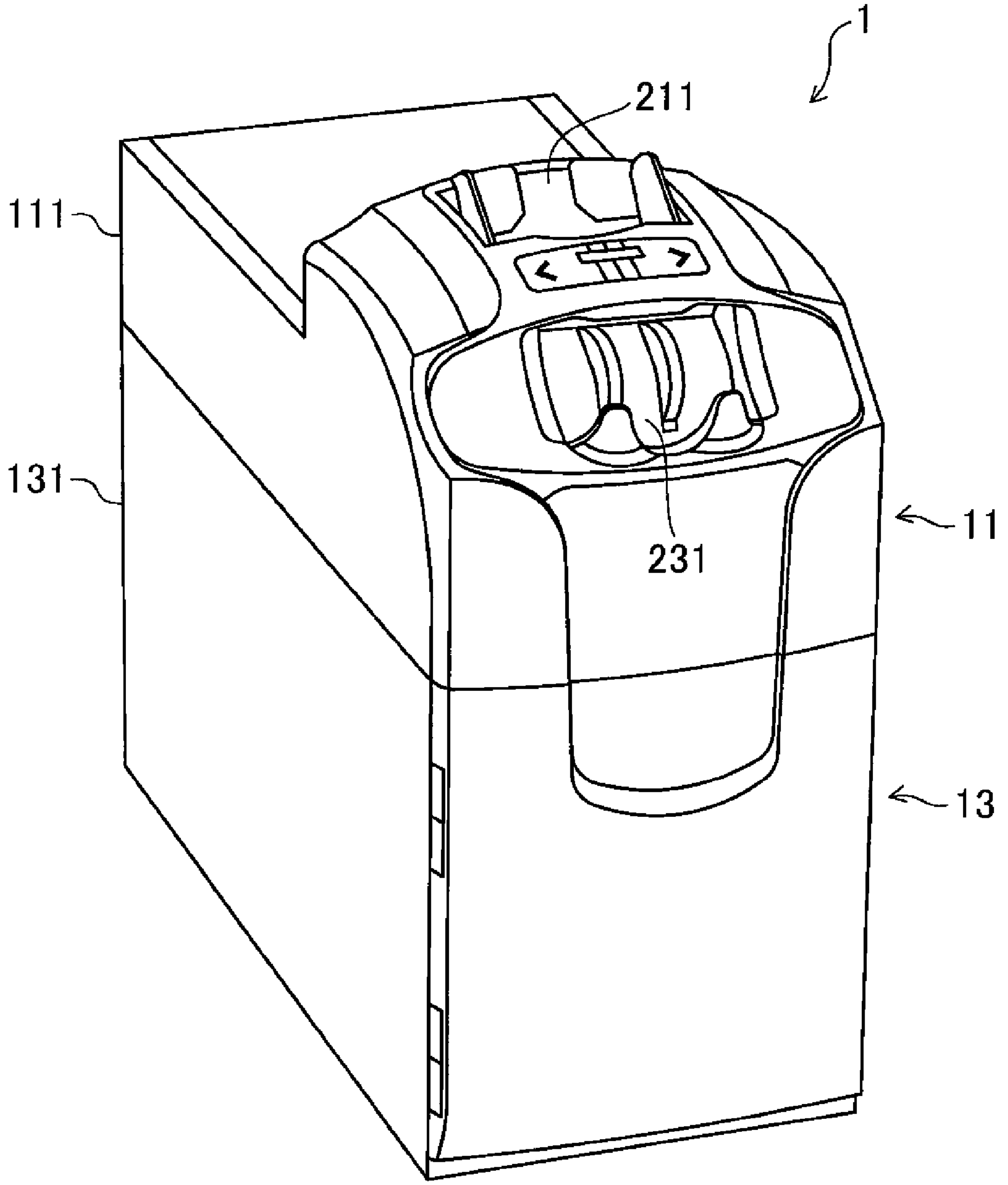
FIG. 1 is a perspective view of an appearance of a banknote depositing/dispensing machine.

An embodiment of a banknote depositing/dispensing machine will be described with reference to the drawings. The following preferred embodiment will be described merely as an example. FIG. 1 shows an appearance of a banknote depositing/dispensing machine (hereinafter merely referred to as a depositing/dispensing machine) 1. The depositing/dispensing machine 1 is placed in a teller counter of a bank, for example, and is shared by two tellers on the right and left sides of the depositing/dispensing machine 1. Thus, the depositing/dispensing machine 1 is basically bilaterally symmetrical.

As described in detail later, the depositing/dispensing machine 1 at least performs a depositing process for storing banknotes placed in an inlet 211 in a storage unit 3, and a dispensing process for dispensing the banknotes stored in the storage unit 3 to an outlet 231. The depositing/dispensing machine 1 is a so-called circulating depositing and dispensing machine. The banknotes dispensed in the dispensing process include the banknotes stored in the storage unit 3 in the depositing process.

Figure 2:
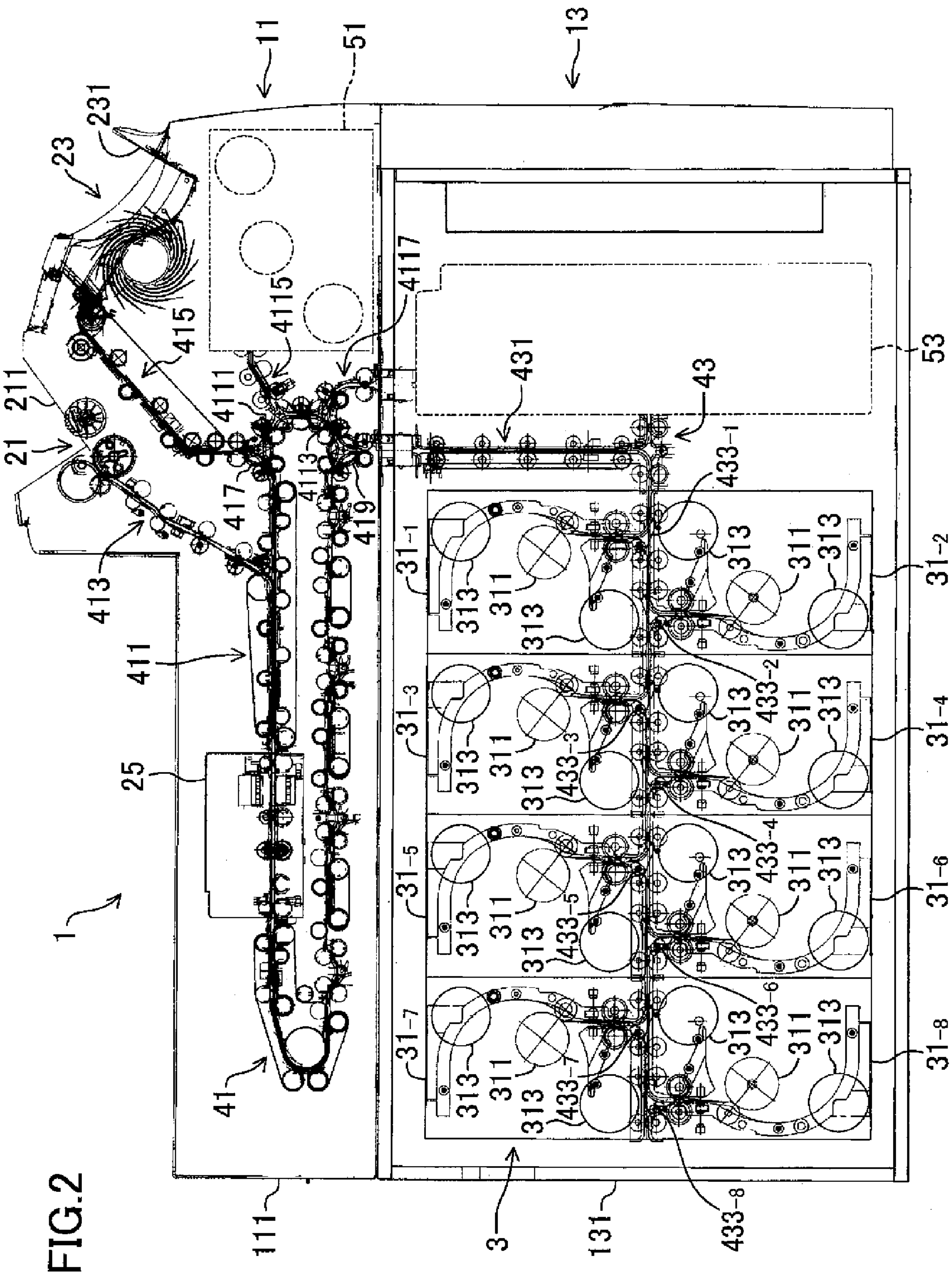
FIG. 2 shows an internal structure of the banknote depositing/dispensing machine.

As shown in FIGS. 1 and 2, the depositing/dispensing machine 1 is broadly divided into an upper handling unit 11 and a lower safe unit 13. A casing 111 constituting the handling unit 11 contains a depositing unit 21 having the inlet 211, a dispensing unit 23 having the outlet 231, a recognition unit 25 configured to recognize the banknotes, and an upper transport unit 41 which includes a looped transport path 411 connecting the depositing unit 21, the dispensing unit 23, and the recognition unit 25. A casing 131 constituting the safe unit 13 contains a storage unit 3 including a plurality of winding storage modules 31 (8 storage modules in the example shown in the figures), and a lower transport unit 43 including a transport path 431 connecting the looped transport path 411 and the storage modules 31 of the upper transport unit 41. Unlike the casing 111 constituting the handling unit 11, the casing 131 constituting the safe unit 13 is a protective casing 131 configured to protect the storage unit 3 etc. contained therein at a predetermined security level or higher.

As described above, the inlet 211 of the depositing unit 21 is a port in which the banknotes to be deposited are placed in the depositing process. The inlet 211 is opened upward in an upper surface of the casing 111, and can receive a plurality of banknotes at a time. The depositing unit 21 includes a feeding mechanism for feeding the plurality of banknotes placed in the inlet 211 one by one to the looped transport path 411.

As described above, the outlet 231 of the dispensing unit 23 is a port to which the banknotes are dispensed in the dispensing process. The outlet 231 is located forward of the inlet 211 (on the right of the inlet in FIG. 2), and is opened obliquely upward between the upper surface and a front surface of the casing 111. Like the inlet 211, the outlet 231 is capable of receiving a plurality of banknotes at a time.

The recognition unit 25 is provided on the looped transport path 411 to recognize authenticity, fitness, and denomination of each of the banknotes transported on the looped transport path 411.

The upper transport unit 41 includes the looped transport path 411 endlessly running in the casing 111. The banknotes are transported on the looped transport path 411 clockwise and counterclockwise in FIG. 2. The looped transport path 411 includes a combination of a plurality of rollers, belts, and guides as shown in FIG. 2. The looped transport path 411 allows long edge feed of the banknotes one by one with a predetermined gap kept between the banknotes.

The looped transport path 411 and the inlet 211 are connected through a depositing path 413, and the banknotes placed in the inlet 211 are transported to the looped transport path 411 through the depositing path 413.

A dispensing path 415 is connected to the looped transport path 411 through a diverter 417 for changing the traveling direction of the banknotes. An end of the dispensing path 415 is connected to the outlet 231. The diverter 417 is configured to keep the banknotes traveling on the looped transport path 411 clockwise or counterclockwise, or to introduce the banknotes to the dispensing path 415. Thus, the banknotes traveling on the looped transport path 411 clockwise or counterclockwise are selectively transported to the outlet 231 by the diverter 417 through the dispensing path 415.

First to third diverters 419, 4111, 4113 are provided on the looped transport path 411. Each of the first to third diverters 419-4113 is positioned at a junction of three transport paths extending in different directions, and selectively transports the banknotes traveling from one of the transport paths to the other two transport paths. Details of the diverters are described in International Patent Publication WO2009/034758.

Specifically, the first diverter 419 is provided at a junction between the looped transport path 411 and the transport path 431 of the lower transport unit 43. The first diverter 419 selectively sends the banknotes traveling on the looped transport path 411 clockwise or counterclockwise to the transport path 431 of the lower transport unit 43 to store the banknotes in the storage unit 3, or allows the banknotes fed from the storage unit 3, and traveling on the transport path 431 of the lower transport unit 43 to travel clockwise or counterclockwise on the looped transport path 411.

The second diverter 4111 is provided at a junction between the looped transport path 411 and a connection path 4115. As described in detail later, the connection path 4115 connects an escrow unit 51 which is shown in a phantom line in FIG. 2 and the looped transport path 411. The second diverter 4111 sends the banknotes traveling on the looped transport path 411 clockwise or counterclockwise to the connection path 4115 to store the banknotes in the escrow unit 51, or transports the banknotes fed from the escrow unit 51 clockwise or counterclockwise on the looped transport path 411. The third diverter 4113 is provided at a junction between the looped transport path 411 and a cassette connection path 4117. As described in detail later, the cassette connection path 4117 connects a collection cassette 53 which is shown in a phantom line in FIG. 2 and the looped transport path 411. The third diverter 4113 selectively sends the banknotes traveling on the looped transport path 411 clockwise or counterclockwise to the cassette connection path 4117 to store the banknotes in the collection cassette 53.

As described above, the storage unit 3 includes first to eighth winding (or tape-type) storage modules $\mathbf{31}_{-1}$ to $\mathbf{31}_{-8}$. In the following description, a set of the eight storage modules will be indicated by a reference character "31," while the first, second, third, . . . storage modules will be indicated by reference characters "$\mathbf{31}_{-1}$, $\mathbf{31}_{-2}$, $\mathbf{31}_{-3}$, . . . " The number of the storage modules 31 is not particularly limited as long as more than one storage module 31 is provided. In this example, two rows of four storage modules 31 arranged in a depth direction of the machine (right-left direction in FIG. 2) are vertically stacked.

The winding storage module 31 includes a tape for guiding the banknotes, a guide, a reel for winding the tape and the banknotes, and a substantially rectangular casing containing the tape, the guide, and the reel as described in Japanese Patent Publication No. 2000-123219.

Alternatively, the winding storage module 31 includes two tapes for sandwiching the banknotes, a reel for winding the two tapes sandwiching the banknotes, and a casing containing the tapes and the reel as described in International Patent Application No. PCT/JP2009/066729 which was previously filed by the applicant. In either structure, the winding storage module 31 winds the banknotes one by one to store them, and feeds the banknotes one by one in a reverse order of the storing order, i.e., the last stored banknote is first fed. In the example shown in FIG. 2, each of the storage modules 31 includes two tape reels 313 around each of which a tape is wound, and the banknotes are sandwiched between the two tapes extending from the tape reels 313. The banknotes are wound around the reel 311 with predetermined gaps provided therebetween. Each of the storage modules 31 is provided with a sensor arranged near an opening communicating the inside and the outside of the casing to detect the passage of the banknotes.

Like the looped transport path 411 of the upper transport unit 41, the transport path 431 of the lower transport unit 43 includes a combination of a plurality of rollers, belts, and guides, and the transport path 431 allows long edge feed of the banknotes one by one. The transport path 431 extends vertically downward from the first diverter 419 on the looped transport path 411, and a lower end thereof is branched forward (to the right in FIG. 2) and rearward (to the left in FIG. 2) in a depth direction of the machine 1. The branch path extending rearward of the machine 1 is arranged between the two vertically stacked rows of the storage modules 31. The storage modules 31 are connected to the branch path through sorters $\mathbf{43}_{-1}$, to $\mathbf{431}_{-8}$, respectively. Each of the sorters $\mathbf{433}_{-1}$ to $\mathbf{431}_{-8}$ is controlled by a control unit 513 described later to sort the banknotes by the denomination and/or the fitness recognized by the recognition unit 25, and to store the sorted banknotes in the plurality of storage modules 31. To the depositing/dispensing machine 1, the escrow unit 51 for temporarily retaining the banknotes, and the collection cassette 53 detachably provided in the protective casing 131 of the safe unit 13 can optionally be attached.

The escrow unit 51 is placed in empty space in the casing 111 forward of the looped transport path in the depth direction as shown in a phantom line in FIG. 2. The escrow unit 51 is connected to the second diverter 4111 through the connection path 4115 as described above. In this example, the escrow unit 51 is a winding unit including two tapes, and stores the banknotes so that the last stored banknote is first fed, like the storage modules 31 described above.

The collection cassette 53 is detachably placed in empty space in the protective casing 131 forward of the storage modules in the depth direction as shown in a phantom line in FIG. 2. The collection cassette 53 is connected to the third diverter 4113 on the looped transport path 411 through the cassette connection path 4117 as described above. Unlike the winding storage modules 31 and the escrow unit 51, the collection cassette 53 contains an ascending/descending table therein to store the banknotes stacked thereon. Thus, the banknotes stored in the collection cassette 53 cannot be fed out of the cassette. For example, the collection cassette 53 stores some of the banknotes placed in the inlet 211 in the depositing process, but not stored in the storage unit 3, i.e., overflowed banknotes. The banknotes which were recognizable and rejected in the dispensing process etc. may also be stored in the collection cassette 53. When the collection cassette 53 is not attached, the overflowed or rejected banknotes are dispensed to the outlet 231.

Although not shown, additional winding storage modules 31 may be placed in the empty space in the protective casing 131 in place of the collection cassette 53. For example, two additional storage modules 31 may vertically be stacked in the empty space. Each of the two storage modules 31 is connected to the branch path extending from the lower end of the transport path 431 forward in the depth direction of the machine through the sorter described above.

Figure 3:
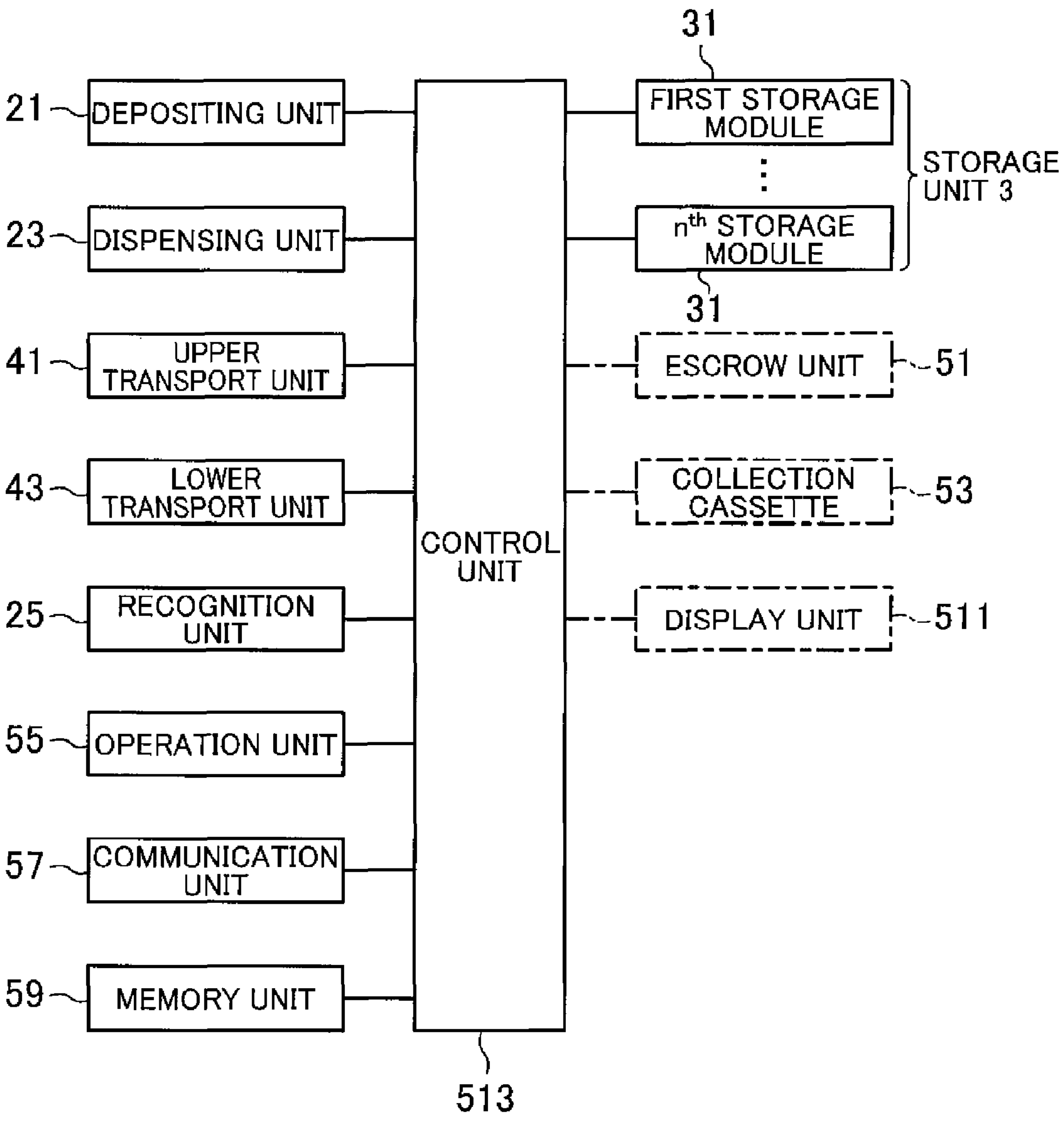
FIG. 3 is a block diagram of a structure associated with control of the banknote depositing/dispensing machine.

FIG. 3 shows a structure associated with control of the depositing/dispensing machine 1. The depositing/dispensing machine 1 includes a control unit 513 which may basically be comprised of a well-known microcomputer. The control unit 513 is connected to the depositing unit 21, the dispensing unit 23, the storage unit 3 including the first to the nth storage modules 31, the upper transport unit 41, and the lower transport unit 43 so that signals can be sent and received therebetween. Although not shown, each of the units 21, 23, 3, 41, and 43 includes a sensor for detecting the banknotes traveling on the transport path, for example, and detection signals from the sensors are input to the control unit 513. The control unit 513 outputs control signals based on the input detection signals, and the units 21, 23, 3, 41, and 43 are operated in accordance with the signals.

The control unit 513 is also connected to the recognition unit 25. The recognition unit 25 sends the recognition result to the control unit 513. Although not shown in FIG. 1 etc., the depositing/dispensing machine 1 is also connected to an operation unit 55 as a human interface for an operator of the depositing/dispensing machine 1, such as a teller, a communication unit 57 for sending and receiving signals between the depositing/dispensing machine 1 and a higher-ranking machine and other devices (not shown) through LAN or a serial bus, and a memory 59 for storing various types of information, e.g., general-purpose storage devices such as a hard disk drive, a flash memory. The memory 59 stores at least an inventory amount which is the respective numbers of the banknotes of different denominations or the amount of the banknotes stored in the depositing/dispensing machine 1. The memory 59 stores the inventory amount of each storage module 31.

As described above, when the optional escrow unit 51 and collection cassette 53 are attached to the depositing/dispensing machine 1, the escrow unit 51 and the collection cassette 53 are also connected to the control unit 513, and are operated by the control signals output from the control unit 513. The depositing/dispensing machine 1 may optionally be provided with a display unit 511, such as a flat panel display, for displaying various types of information. The display unit 511 is also connected to the control unit 513. The control unit 513 controls the units 21, 23, 25, 3, 41, 43, 51, 53, 55, 57, 59, and 511 according to a command sent from the higher-ranking machine through the communication unit 57, and/or various commands sent through the operation unit 55. Thus, the depositing/dispensing machine 1 performs various processes including the depositing and dispensing processes described below. The processes performed by the depositing/dispensing machine 1 are stored as a log in the memory 59.

(Depositing Process)

The depositing process is a process for depositing (storing) the banknotes in the depositing/dispensing machine 1. Each of the banknotes placed in the inlet 211 is stored in any of the storage modules 31 based on the results of the recognition by the recognition unit 25, and the predetermined numbers of the banknotes allocated to the storage modules 31. More specifically, the depositing/dispensing machine 1 performs the depositing process in the following manner. When the banknotes are placed in the inlet 211, a command to start the depositing process is input to the depositing/dispensing machine 1 by operating the higher-ranking machine and/or the operation unit 55. As indicated by arrows in FIG. 4, the feeding mechanism of the depositing unit 21 feeds the banknotes in the inlet 211 one by one, and the upper transport unit 41 transports the banknotes to the recognition unit 25. The recognition unit 25 recognizes and counts the banknotes. The upper transport unit 41 transports the banknotes recognized as acceptable by the recognition unit 25 (the acceptable banknotes will be referred to as normal banknotes in contrast with the rejected banknotes) from the looped transport path 411 to the transport path 431 of the lower transport unit 43 through the first diverter 419 as indicated by solid arrows in FIG. 4. The lower transport unit 43 stores each of the banknotes in the predetermined storage module 31 based on the results of the recognition by the recognition unit 25, and the predetermined numbers of the banknotes allocated to the storage modules. Specifically, each of the banknotes is stored in the corresponding storage module 31 based on the denomination or fitness.

Figure 4:
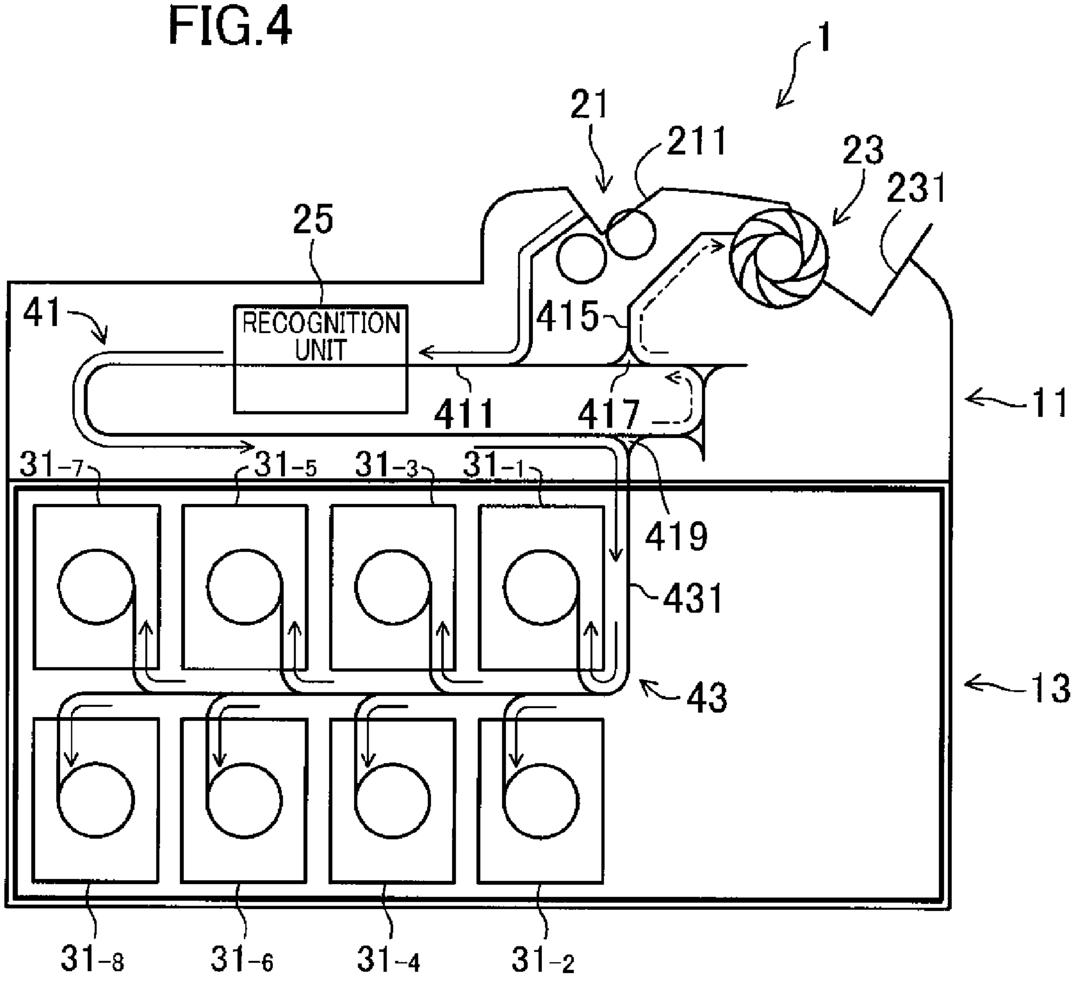
FIG. 4 shows a transport path for transporting banknotes in a depositing process.

The upper transport unit 41 transports the rejected banknotes which cannot be accepted by the depositing/dispensing machine 1, such as the banknotes which cannot be authenticated by the recognition unit 25, from the looped transport path 411 to the dispensing path 415 through the diverter 417 as indicated by dot-and-dash arrows in FIG. 4. The rejected banknotes are then dispensed to the outlet 231. The banknotes rejected in the depositing process are placed again in the inlet 211, and are recognized again by the recognition unit 25.

When the storage modules 31 become full in the depositing process, and the banknotes cannot be stored any more in the storage modules 31, these banknotes (overflowed banknotes) are also dispensed to the outlet 231. Although not shown, the overflowed banknotes are stored in the collection cassette 53 when the collection cassette 53 is attached to the depositing/dispensing machine 1.

The inventory amount stored in the memory 59 is updated after the depositing process is finished.

(Depositing Process with the Escrow Unit Attached)

Figure 5:
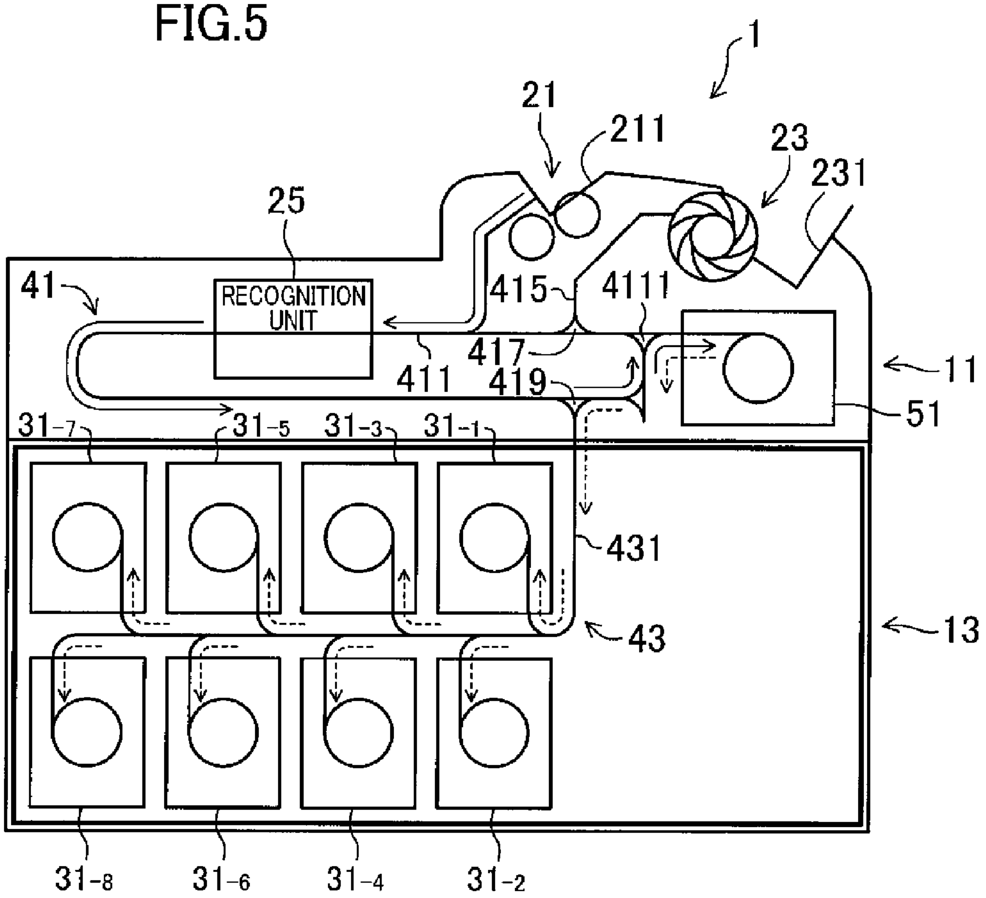
FIG. 5 shows a transport path for transporting the banknotes in the depositing process using an escrow unit.

FIG. 4 shows the depositing process performed without providing the escrow unit 51 in the depositing/dispensing machine 1. FIG. 5 shows the depositing process performed with the escrow unit 51 provided in the depositing/dispensing machine 1. Also in this example of FIG. 5, in the same manner as shown in FIG. 4, the feeding mechanism of the depositing unit 211 feeds the banknotes placed in the inlet 211 one by one, and the upper transport unit 41 transports the banknotes to the recognition unit 25. The upper transport unit 41 transports the normal banknotes recognized as acceptable by the recognition unit 25 from the looped transport path 411 to the escrow unit 51 through the second diverter 4111 as indicated by solid arrows in FIG. 5 to store the banknotes in the escrow unit. The rejected banknotes are dispensed to the outlet 231.

When the banknotes placed in the inlet 211 are all fed, and all the fed banknotes are counted, the count result is displayed on the higher-ranking machine and/or the optional display unit 511. The operator checks the result, and then performs predetermined operation at the higher-ranking machine and/or the operation unit 55. Thus, the escrow unit 51 feeds the banknotes stored therein one by one, and the upper transport unit 41 transfers the fed banknotes to the lower transport path 431 through the looped transport path 411 and the first diverter 419 as indicated by dot arrows in FIG. 5. Then, the lower transport unit 43 sorts the banknotes by the denomination or fitness based on the results of the recognition by the recognition unit 25 and the predetermined numbers of the banknotes allocated to the storage modules to store the banknotes in the storage modules 31. When the operator performs predetermined canceling operation instead of the storing operation, the banknotes stored in the escrow unit 51 are dispensed to the outlet 231.

(Dispensing Process)

The dispensing process is a process for dispensing the banknotes stored in the depositing/dispensing machine 1. Specifically, the dispensing process is started by performing predetermined dispensing operation of specifying at least the denomination and the number of the banknotes at the higher-ranking machine and/or the operation unit 55. The storage unit 3 feeds the specified number of the banknotes of the specified denomination from the storage modules 31 as indicated by solid arrows in FIG. 6. The lower transport unit 43 transports the fed banknotes to the looped transport path 411 of the upper transport unit 41 through the transport path 431. The upper transport unit 41 transports the banknotes to the recognition unit 25, and transports the banknotes recognized by the recognition unit 25 from the looped transport path 411 to the dispensing path 415 through the diverter 417. Thus, the banknotes are dispensed to the outlet 231. The inventory amount stored in the memory 59 is updated after the dispensing process is finished.

When the number of the dispensed banknotes exceeds the capacity of the outlet 231, the banknotes may be dispensed in several times, i.e., a divisional dispensing process is performed. Specifically, in the divisional dispensing process, the process is suspended when half or less of the banknotes corresponding to the capacity of the outlet 231 is dispensed, the dispensed banknotes are removed from the outlet 231, and then the dispensing process is restarted. The suspension and the restart of the process are repeated based on the number of the banknotes to be dispensed.

Figure 6:
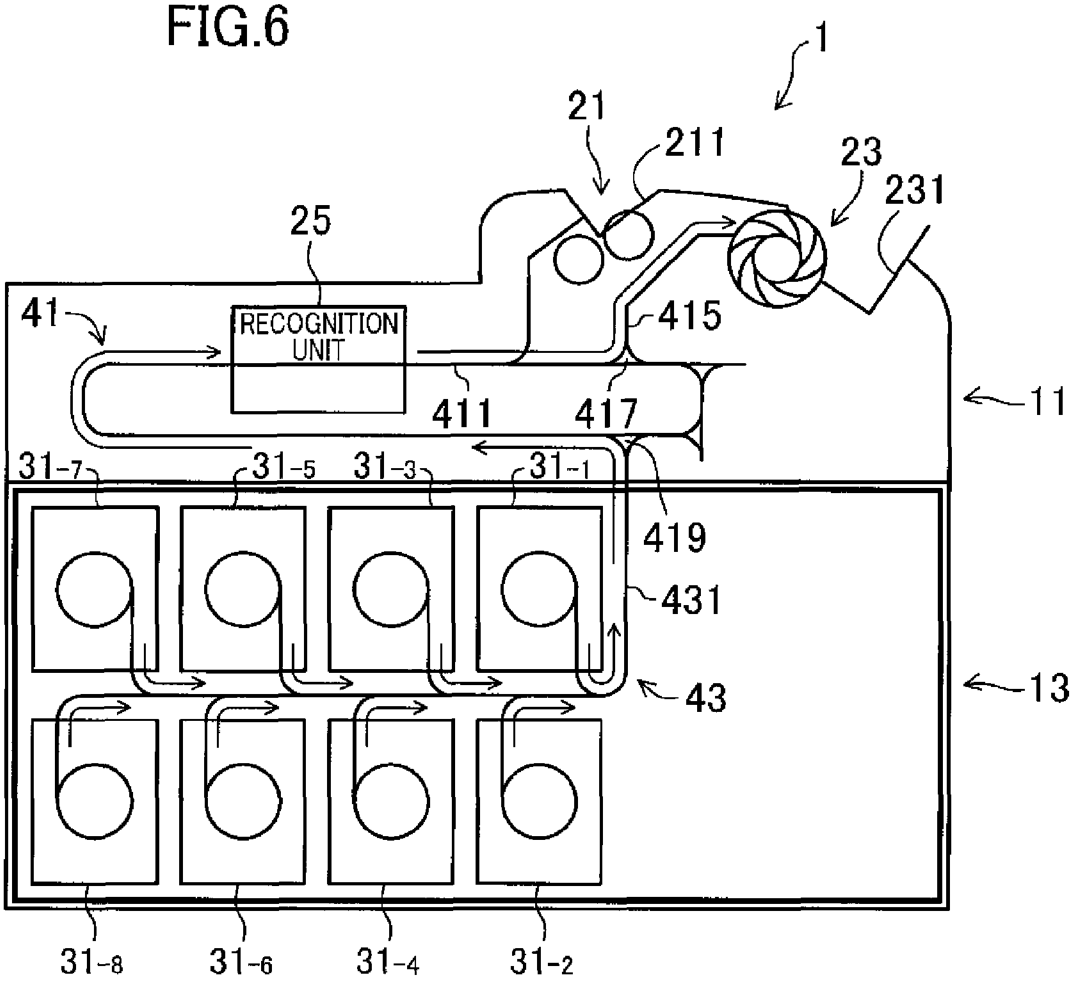
FIG. 6 shows a transport path for transporting the banknotes in a dispensing process.

When the depositing/dispensing machine 1 does not include the escrow unit 51 and the collection cassette 53 as shown in FIG. 6, the banknotes which are not recognizable by the recognition unit 25 and are rejected in the dispensing process are dispensed to the outlet 231 together with the normal banknotes. Thus, when the banknotes are rejected in the dispensing process, the depositing/dispensing machine 1 and/or the display unit 511 displays that the banknotes are rejected (error message). This can inform the operator that the rejected banknotes are contained in the banknotes dispensed to the outlet 231.

(Reconciliation Process)

In some cases, the banknotes recognized and counted by the recognition unit 25 may irregularly be transferred to the storage modules 31 in the depositing process. For example, the banknotes transferred on the transport paths 411, 431 may be skewed, may be chained without the predetermined gap therebetween, or may be overlapped. Such irregular transfer can be detected by checking the results of the recognition by the recognition unit 25 against the results of the detection by the sensors of the storage modules 31.

When the banknotes are chained or overlapped in the depositing process, the order of the banknotes is changed, and the banknotes may not be stored in the corresponding storage modules 31. In such a case, the denominations or the numbers of the banknotes stored in the storage modules 31 may be uncertain. Thus, when the irregular transfer occurs in the depositing process, a process of determining the denominations and the numbers of the banknotes stored in the storage modules 31 is required. This process is called a reconciliation process. The reconciliation process includes, feeding all the banknotes out of the storage module 31 which requires the reconciliation, recognizing and counting the fed banknotes by the recognition unit 25, and returning the banknotes to the storage module 31. The banknotes fed from the storage module 31 are temporarily stored in a different storage module 31 before or after the recognition. When the depositing/dispensing machine 1 includes the escrow unit 51, the banknotes may temporarily be stored in the escrow unit 51.

The irregular transfer occurred in the depositing process is detected by checking the results of the recognition by the recognition unit 25 against the results of the detection by the sensors of the storage modules 31 as described above. Thus, the irregular transfer is detected only after all the banknotes are stored in the storage modules 31. The reconciliation process needs to be performed on every storage module 31 in which at least one banknote is stored in the depositing process, and all the banknotes stored in the corresponding storage modules 31 need to be fed out. Thus, the reconciliation process tends to take long time. The more banknotes the storage modules 31 store, the longer time the reconciliation takes.

In the dispensing process described above, the number of the banknotes fed from the storage module 31 may become uncertain when the banknotes are chained or overlapped during the transfer, or one or more banknotes are rejected. Thus, the inventory amount in the storage module 31 after the dispensing process (the number of the banknotes stored in the storage module 31) becomes uncertain. Thus, the reconciliation process is performed on every storage module 31 from which at least one banknote is fed to determine the inventory amount in each of the storage modules 31.

However, the depositing/dispensing machine 1 cannot be used during the reconciliation process performed after the depositing process and after the dispensing process. This disadvantageously delays the teller's work.

In the depositing/dispensing machine 1, the time taken to perform the reconciliation process is reduced by storing the banknotes in the storage module 31 in an original manner. Thus, every banknote stored in the storage module 31 is not fed in the reconciliation process, but at least some of the banknotes are fed to perform the reconciliation process on the storage module 31, thereby reducing the time taken for the reconciliation process. The reconciliation process performed by feeding some of the banknotes stored in the storage module 31 may be referred to as a partial reconciliation process.

(Example of How the Banknotes Are Stored in the Storage Module)

Figure 7:
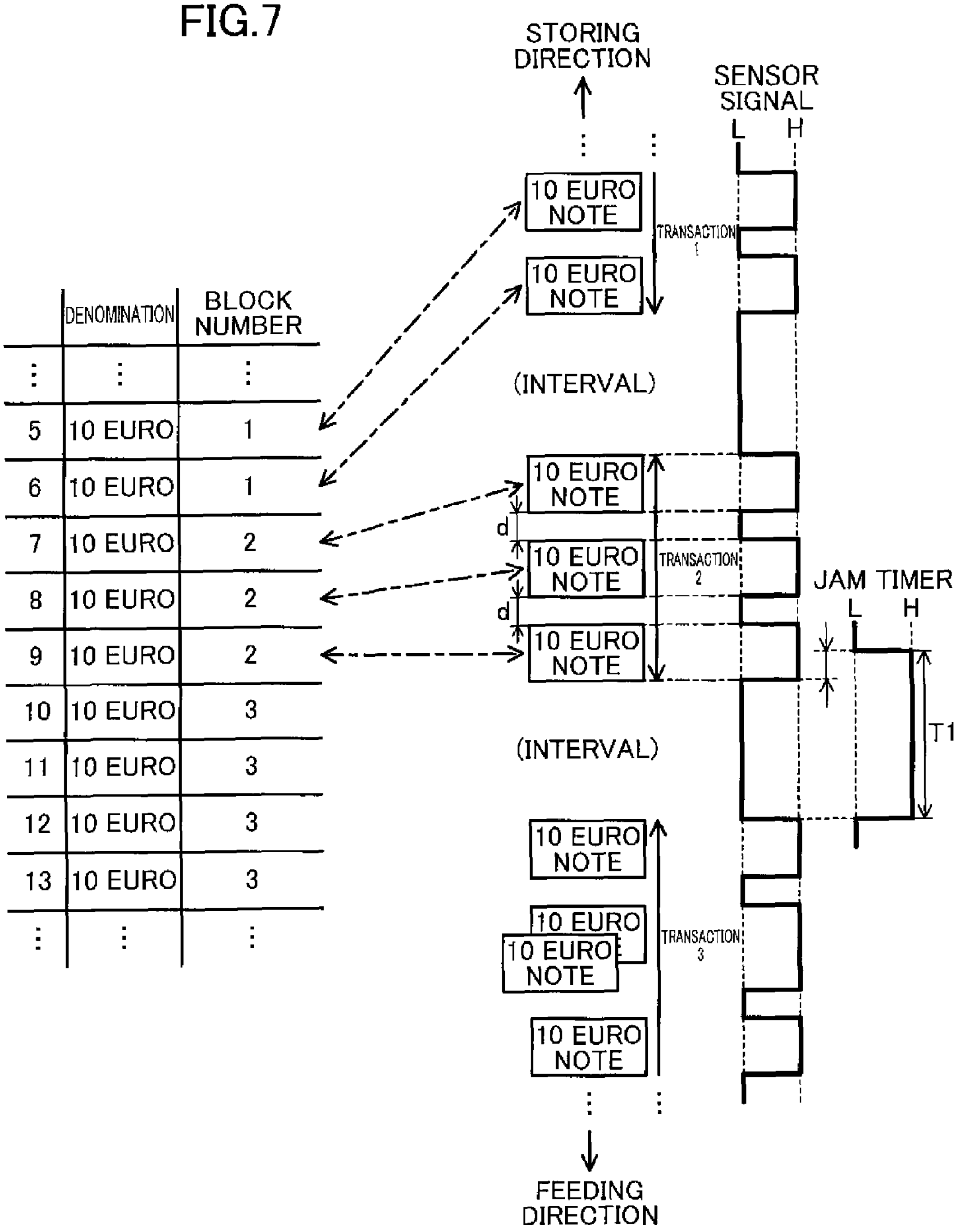
FIG. 7 shows how the banknotes are stored in a storage unit, and a partial reconciliation process performed on the stored banknotes.

FIG. 7 shows an example of how the banknotes are stored in the storage module 31. FIG. 7 shows in a center part the banknotes wound on the reel 311 of the winding storage module 31 in a developed view. The upward direction in FIG. 7 corresponds to a direction radially inward of the reel 311, and the downward direction in FIG. 7 corresponds to a direction radially outward of the reel 311. Thus, the upper banknote shown in FIG. 2 is stored earlier in the storage module 31, and the lower banknote shown in FIG. 2 is stored later in the storage module 31. When the banknotes are fed from the storage module 31, the banknotes are sequentially fed out from the lower banknote.

As described above, in the depositing process, the banknotes are wound on the reel 311 with a predetermined distance d kept between each of the banknotes. In the example shown in FIG. 7, an interval larger than the predetermined distance d is provided between every depositing process (between every transaction).

The memory 59 stores pieces of storage information corresponding to each storage module 31, each of which associating a consecutive number, denomination, and a block number of the banknote with each other as shown in a left part of FIG. 7. The consecutive number is given to each of the banknotes stored in the storage module 31, and indicates the number of the banknotes stored in the storage module 31. The "block number" is given to a set of the banknotes stored in the storage module 31 in a period between the adjacent intervals, and can be considered as a "transaction number." Thus, the consecutive number, i.e., the inventory amount in the storage module 31, can be associated with the block number, i.e., the interval, by associating the consecutive number and the block number. In the example shown in FIG. 7, the banknotes wound on the reel 311 and the pieces of storage information are associated as indicated by dot-and-dash arrows. The pieces of storage information stored in the memory 59 are updated every time the depositing process is performed.

Suppose that the banknotes are irregularly transferred in the depositing process. In this example, the depositing process in which the irregular transfer has occurred is "transaction 3" as shown in FIG. 7. "Transaction 1" and "transaction 2" are depositing processes performed before the transaction 3, and the irregular transfer does not occur in the transactions 1 and 2. The inventory amounts in the storage module 31 after the transaction 1 and after the transaction 2 have been determined by the pieces of storage information stored in the memory 59.

Since the irregular transfer occurred in the transaction 3, the reconciliation process needs to be performed on the corresponding storage module 31 after the transaction 3 is finished. At this time, only the banknotes which were wound on the reel 311 after the last interval are fed from the storage module 31. Specifically, only the banknotes stored in the storage module 31 in the transaction 3 are fed from the storage module 31 to perform the reconciliation process. Since at least the inventory amount in the storage module 31 after the transaction 2 has been determined, the inventory amount of the storage module 31 can be determined based on the inventory amount after the transaction 2 and the results of the reconciliation process. Thus, with the provision of a mark associated with the inventory amount of the storage module 31 (i.e., the interval in this example) in storing the banknotes, the reconciliation process can be performed by feeding only some of the banknotes, without feeding every banknote stored in the storage module 31. This can reduce the time for the reconciliation process. The banknotes wound in the transaction 3 may be fed as described above. However, for example, the banknotes stored in the depositing process in which the irregular transfer occurred (the transaction 3) and the banknotes stored in the depositing process immediately before the depositing process in which the irregular transfer occurred (the transaction 2) may be fed out of the storage module. The number of the fed banknotes may optionally be determined.

The interval can be detected based on the signal from the sensor arranged near the opening of the storage module 31 as shown in a right part of FIG. 7. Specifically, when a gap larger than the predetermined distance d is detected in feeding the banknotes, i.e., when the interval is detected, the feeding of the banknotes from the storage module 31 can be stopped. The interval may preferably be smaller than a gap corresponding to time T1 for a jam timer to detect jamming of the banknotes. This can prevent erroneous detection of the jamming of the banknotes.

When the reconciliation process is required in the dispensing process, the banknotes can be fed from the storage module 31 until the intended interval is detected. For example, when the banknotes are fed until the last provided interval is detected, the number of the fed banknotes can be minimized, thereby advantageously reducing the time for the reconciliation process. Thus, the partial reconciliation process can be performed after the dispensing process, like the reconciliation process performed after the depositing process.

When the interval is provided between every transaction, the number of the intervals may be too much, and the number of the banknotes stored in the storage module 31 may be reduced. Thus, instead of providing the interval between every transaction, the interval may be provided every time the number of the banknotes stored in the storage module 31 exceeds the predetermined number. This can reduce the number of the intervals as compared with the case where the interval is provided between every transaction, and can avoid reduction of the capacity of the storage module 31 due to the increased number of the intervals. Further, this eliminates the need to feed every banknote stored in the storage module 31 in the reconciliation process as described above, and the time for the reconciliation process can be reduced. This is particularly advantageous in striking a balance between ensuring the storage capacity and reducing the time for the reconciliation.

The partial reconciliation process can be performed by providing the mark associated with the inventory amount in the storage module 31. Marks except for the above-described intervals between the banknotes can also be used. For example, an example where a serial number of each banknote is used as the mark, and an example where a position of the banknote on the tape winding the banknotes in the storage module 31 (tape address) is used as the mark will be described below. Specifically, the mark for performing the partial reconciliation process may be a physical mark including shapes and physical quantities, such as the intervals between the banknotes, the position of the banknote on the tape, and a logical mark stored as data, such as the serial number. The marks may be used alone, or may be used in combination to improve reliability.

(Example of How the Banknotes Are Stored Using the Serial Number)

Figure 8:
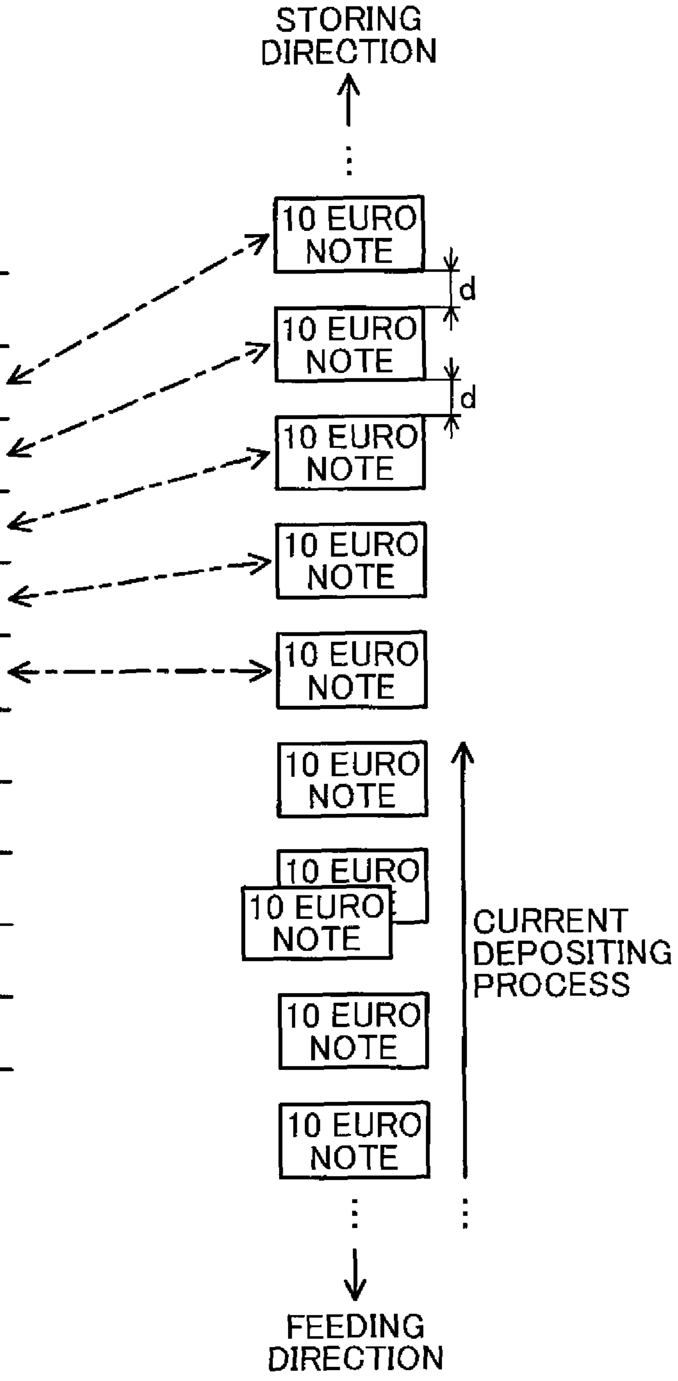
FIG. 8 shows a partial reconciliation process by recording serial numbers of the banknotes.

FIG. 8 shows how the banknotes are stored in the storage module 31 using the serial numbers of the banknotes. In this example, the banknotes are wound on the reel 311 with the predetermined distance d provided therebetween, but without the intervals between the banknotes, as shown in FIG. 8.

In this example, the serial numbers need to be read and stored in storing the banknotes in the storage module 31. For example, the recognition unit 25 may read the serial numbers. In this case, the recognition unit 25 may be configured to recognize authenticity, fitness, and denomination of each of the banknotes, and to optically read the serial number printed on each of the banknotes. A reading unit different from the recognition unit 25 may be provided on the looped transport path 411, for example, to read the serial number. The serial number read in this manner is associated with the consecutive number and the denomination as a piece of information for each of the storage modules 31, and is stored in the memory 59 as shown in a left part of FIG. 8. Thus, the inventory amount (i.e., the consecutive number) and the mark (i.e., the serial number) are associated with each other. In the example shown in FIG. 8, the banknotes wound on the reel 311 and the pieces of storage information are associated as indicated by dot-and-dash arrows. The pieces of storage information stored in the memory 59 are updated every time the depositing process is performed as described above.

In this configuration, when the irregular transfer has occurred in the depositing process, and the reconciliation process is required, "the banknotes stored in the storage module 31 in the depositing process" and "at least one more banknote" are fed from the storage module 31. Then, the fed banknotes are recognized and counted, and at least the serial number of the last fed banknote is read. The read serial number is checked against the serial number contained in the pieces of storage information stored in the memory 59. When the read serial number is found in the storage information, the denomination and the number of the banknotes stored before the last fed banknote have been determined by the storage information in the memory. Thus, the feeding of the banknotes from the storage module 31 is stopped to finish the reconciliation process. When the read serial number is not found in the storage information, the feeding of the banknotes from the storage module 31 is continued until the banknote having the serial number contained in the storage information is fed.

When the reconciliation process is required in the dispensing process, the reconciliation process is performed by feeding the banknotes from the storage module 31 until the banknote having the serial number contained in the storage information is fed.

In this example, the serial number of the banknote is used as the mark, and at least some of the banknotes stored in the storage module 31 are fed for the reconciliation process. Thus, like the example using the intervals described above, the time for the reconciliation process can be reduced. Further, since the relatively large intervals are not provided between the banknotes wound on the reel 311, the capacity of the storage module 31 is not reduced.

Instead of reading and storing the serial number of every banknote, the serial number may be read and stored every time a predetermined number of the banknotes has passed, or the serial number of the banknote wound last time in each transaction may be read and stored. These reading and storing may be combined. This can advantageously save the storage capacity of the memory 59. In checking the serial number, whether alphabets and numerals constituting the serial number completely coincide with those of the stored serial number may be checked, or whether at least some of the alphabets and numerals coincide with those of the stored serial number may be checked. This may advantageously reduce the time for the reconciliation process. Whether at least some of the alphabets and numerals coincide with those of the stored serial numbers of more than one banknotes may be checked.

(Example of How the Banknotes Are Stored using Tape Address)

Figure 9:
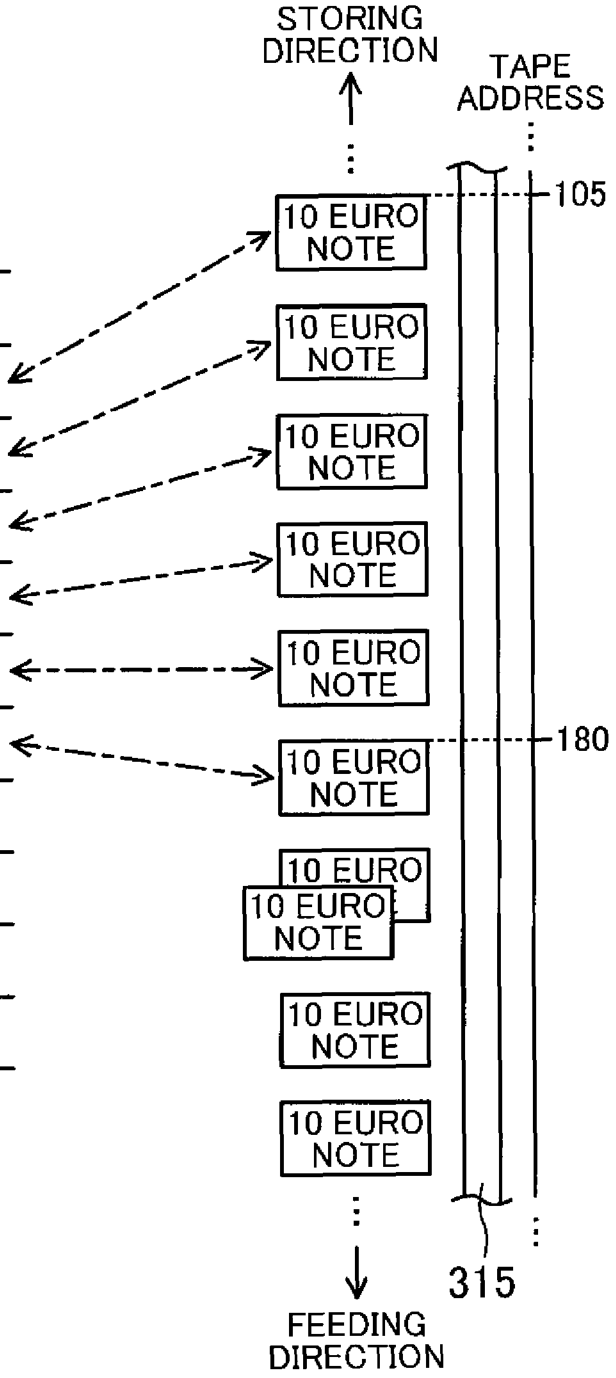
FIG. 9 shows a partial reconciliation process by recording addresses on a tape.

FIG. 9 shows how the banknotes are stored using the tape address. As described above, the winding storage module 31 winds the banknotes by winding two tapes sandwiching the banknotes therebetween on the reel 311. Thus, as shown in FIG. 9, a lengthwise position on a tape 315 and each of the banknotes wound on the reel 311 are associated with each other. In this example, the lengthwise position on the tape 315 will be referred to as a "tape address," and is used as the mark. The lengthwise position on the tape 315 (i.e., the tape address) can be obtained by an output (pulse number) of an encoder which is provided in the storage module 31 to detect whether the tape 315 is fed or wound back. For example, calibration may be performed to associate the output of the encoder and the tape address by feeding and winding the tape 315 upon starting the depositing/dispensing machine 1 (when the machine is in an initial state).

In this example, the tape address corresponding to the wound banknote is specified by the output of the encoder every time the predetermined number of the banknotes is stored in the storage module 31 in the depositing process. Then, the tape address is associated with the consecutive number and the denomination, and is stored as the storage information in the memory 59. Thus, the inventory amount (i.e., the consecutive number) and the mark (i.e., the tape address) are associated with each other. The address on the tape 315 may not be stored every time the predetermined number of the banknotes is stored, but the tape address corresponding to each banknote may be stored. The tape address corresponding to the banknote which is first stored in the transaction, or the tape address corresponding to the banknote which is last stored in the transaction may be stored. The tape address associated with the number of the banknotes and the tape address associated with the transaction may be stored in combination. In the example shown in FIG. 9, the banknotes wound on the reel 311 and the pieces of storage information are associated with each other as indicated by dot-and-dash arrows. The pieces of storage information in the memory 59 are updated every time the depositing process is performed as described above.

In this configuration, when the irregular transfer has occurred in the depositing process, and the reconciliation process is required, the reconciliation process is performed by feeding the banknotes until the banknote which was stored in the storage module 31 before the current depositing process, and with which the address on the tape 315 is associated is fed. This is because the denomination and the number of the banknotes stored before the banknote with which the address on the tape 315 is associated have been determined by the storage information stored in the memory 59.

When the reconciliation process is required in the dispensing process, the banknotes are fed from the storage module 31 until the banknote corresponding to the stored tape address is fed.

In this example, the tape address is used as the mark, and at least some of the banknotes stored in the storage module 31 are fed to perform the reconciliation process. Thus, like the above-described example using the intervals, the time for the reconciliation process can be reduced. Further, since the relatively large intervals are not provided between the banknotes wound on the reel 311, the storage capacity of the storage module 31 is not reduced. The reconciliation process can be performed when the interval between the banknotes is associated with the tape address, instead of associating the banknote with the tape address.

(Shift from Dispensing Process to Counting Process)

Japanese Patent Publication No. 2009-9605 teaches a machine for depositing and dispensing banknotes installed in an automatic teller machine. The depositing/dispensing machine includes a plurality of storage units each storing the banknotes. In a dispensing process, the depositing/dispensing machine feeds the banknotes stored in the storage units, recognizes the fed banknotes through a recognition unit, and then dispenses the recognized banknotes to an outlet. The storage units of the depositing/dispensing machine include storage units for storing the banknotes dispensed in the dispensing process (recycling containers), and a storage unit for storing the banknotes which are not dispensed (a deposit container). The depositing/dispensing machine including both of the recycling rooms and the deposit room increases in size. If a size of a casing of the machine is not increased, the capacity of the recycling containers is reduced by the capacity of the deposit container.

International Patent Publication No. WO2008/047094 teaches a banknote depositing/dispensing machine which is placed in a teller counter of a financial institution, such as a bank, and is operated by a teller at a teller window. The depositing/dispensing machine includes the recycling containers, but does not include the deposit container. Thus, the depositing/dispensing machine is small, and is advantageously placed in the teller counter.

In the depositing/dispensing machine described in Japanese Patent Publication No. 2009-9605, one or more banknotes which are not recognizable, and are rejected in the dispensing process are stored in the deposit container.

In the depositing/dispensing machine described in International Patent Publication No. WO2008/047094, however, the banknotes rejected in the dispensing process are dispensed to the outlet together with normal banknotes because the depositing/dispensing machine does not include the deposit container. An operator is informed of the existence of the rejected banknotes by an error message. Due to the rejection of the banknotes, an inventory amount of the banknotes stored in the storage unit after the dispensing process may be uncertain.

Thus, when the rejected banknotes are dispensed to the outlet in the dispensing process, the operator needs to count the banknotes dispensed to the outlet manually or using a counting device. This complicates the operator's work. When the rejected banknotes and the normal banknotes are both dispensed to the outlet, the number of the dispensed banknotes is quite large. The larger the number of the dispensed banknotes is, the larger load is imposed on the operator in counting the banknotes. Thus, regarding the machine which is configured to dispense the rejected banknotes to the outlet, reducing the load on the operator and suitably handling the banknotes are both required.

In other words, a money handling apparatus which can suitably handle money when the money is rejected in the dispensing process is required.

In view of this, a money handling apparatus which performs at least a process of dispensing money and a process of counting the money, may have the following configurations.

That is, the money handling apparatus includes: a storage unit configured to store the money and feed the stored money; a recognition unit configured to recognize at least whether the money is normal money or money to be rejected; a dispensing unit to which the money is dispensed; and a control unit configured to allow feeding of a required number of the money from the storage unit, recognition of the fed money by the recognition unit, and dispensing of the recognized money to the dispensing unit in the dispensing process.

The control unit allows dispensing of at least the money rejected by the recognition unit to the dispensing unit in the dispensing process, and then goes into standby for the counting process to count the money dispensed to the dispensing unit.

According to this configuration, the storage unit feeds the money stored therein in the dispensing process. The "money" includes banknotes and coins. The recognition unit recognizes whether the money fed from the storage unit is the normal money or the money to be rejected. The recognized money is dispensed to the dispensing unit.

For example, the banknotes which are overlapped, and are not recognizable by the recognition unit, are rejected and dispensed to the dispensing unit. Both of the rejected money and the normal money may be dispensed to the dispensing unit. Since the money handling apparatus is configured to dispense the rejected money to the dispensing unit, the money handling apparatus may not include a particular storage unit for storing the rejected money (e.g., a collection cassette which is detachably attached to the money handling apparatus). This can advantageously downsize the apparatus.

The money handling apparatus is configured to dispense the rejected money to the dispensing unit. Thus, when the money is rejected in the dispensing process, the counting process is required to determine the denominations and the amount of the money actually dispensed to the dispensing unit. Thus, when the money is rejected in the dispensing process, and the money is dispensed, the money handling apparatus goes into standby for the counting process to count the money dispensed to the dispensing unit. Since the money handling apparatus performs the counting process, the need for the operator to manually count the money is eliminated, thereby reducing the load on the operator. Further, the counting process performed by the apparatus ensures high accuracy. This is particularly advantageous when the rejected money and the normal money are both dispensed to the dispensing unit, and the amount of the money to be counted is large.

Since the counting process is sequentially performed after the dispensing process by the same money handling apparatus which performs the dispensing process, the operator's work can be simplified, thereby further reducing the load on the operator. Further, a history of the processes can advantageously be recorded when the dispensing process and the counting process are performed by the same apparatus.

Performing the counting process after the dispensing process can determine the inventory amount in the storage unit after the dispensing process. This allows suitable handling of the money when the money is rejected in the dispensing process.

As described above, the depositing/dispensing machine 1 shown in FIG. 1 is configured to dispense the banknotes rejected in the dispensing process to the outlet 231 together with the normal banknotes when the collection cassette 53 is not attached thereto (see FIG. 6). Thus, when one or more banknotes are rejected, the counting process is required to specify the banknotes and determine the number of the banknotes dispensed to the outlet 231. The inventory amount in the storage unit 3 may be uncertain unless the banknotes dispensed to the outlet 231 are counted. Since the depositing/dispensing machine 1 is configured to dispense the rejected banknotes to the outlet 231, the counting process is inevitably performed when one or more banknotes are rejected in the dispensing process. The operator generally counts the dispensed banknotes manually or using a counting device (e.g., a banknote counter). For the purpose of reducing the load on the operator, the depositing/dispensing machine 1 is configured to go into standby for the counting process when one or more banknotes are rejected in the dispensing process.

Figure 10:
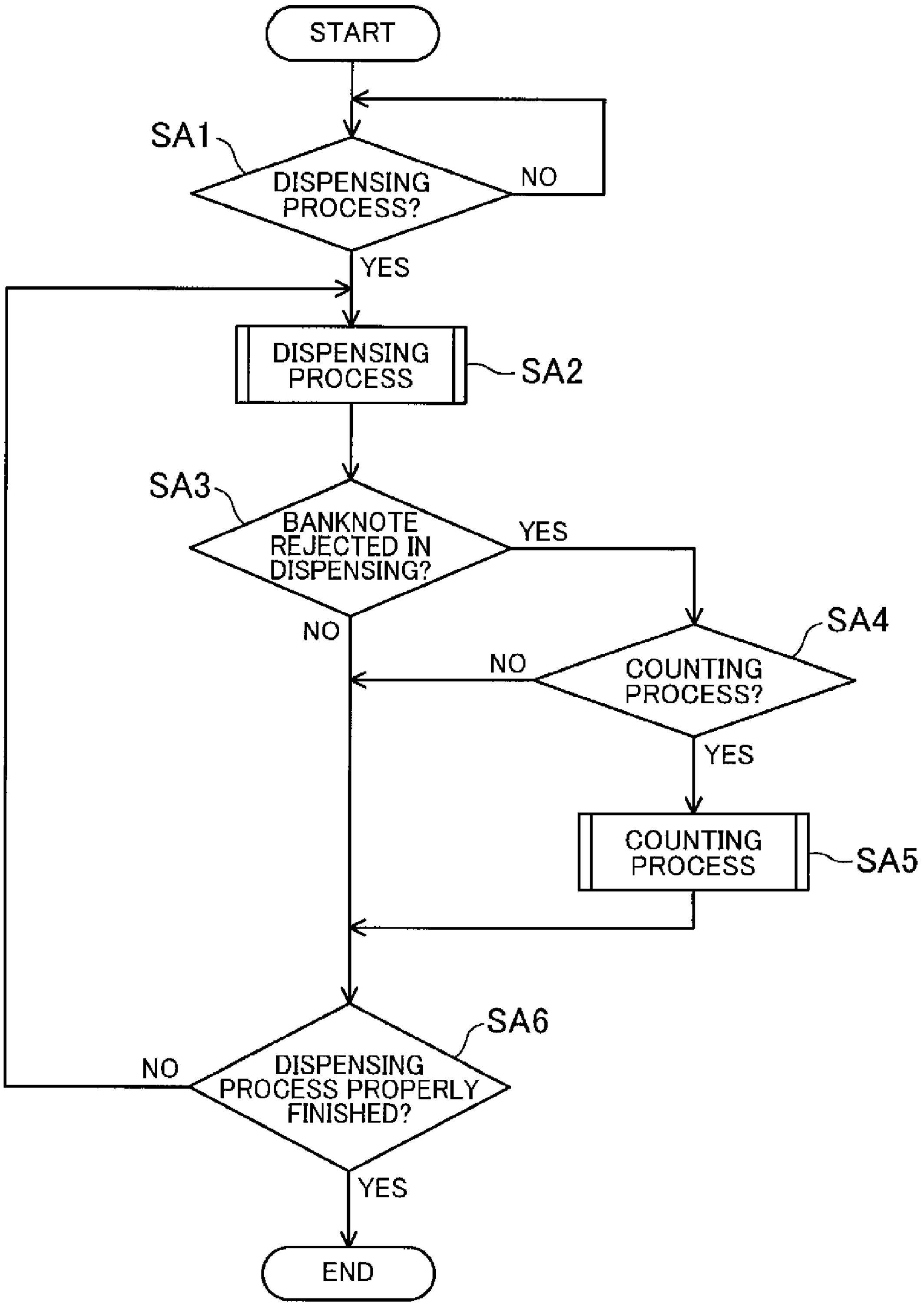
FIG. 10 shows a flowchart of a dispensing process performed by the banknote depositing/dispensing machine.

FIG. 10 shows a flowchart of the dispensing process of the depositing/dispensing machine 1. In step SA1 immediately after the start, whether or not a command to perform the dispensing process is input by the operator is determined. When the command to perform the dispensing process is not input (NO is selected), step SA1 is repeated. Specifically, the machine waits until the command to perform the dispensing process is input. When the command to perform the dispensing process is input (YES is selected), the flow proceeds to step SA2. In step SA2, the dispensing process is performed as described above.

In step SA3, whether or not one or more banknotes are rejected in the dispensing process is determined. When the banknotes are not rejected (NO is selected), the flow is finished. When one or more banknotes are rejected (YES is selected), the flow proceeds to step SA4. At this time, the memory 59 stores a log of the dispensing process where the banknotes are rejected as a log where the dispensing process requires a counting process, together with the inventory amount before the dispensing process.

In step SA4, whether or not a command to perform the counting process is input by the operator is determined. Specifically, the depositing/dispensing machine 1 is configured in such a manner that the operator can optionally select whether the counting process is necessary or not after the dispensing process. For example, when the dispensing processes should sequentially be performed not to delay the teller's work, the counting process may be performed after the dispensing processes are sequentially performed. Thus, in the depositing/dispensing machine 1, the operator optionally selects whether the counting process should be performed after the dispensing process or not. This can improve usability of the depositing/dispensing machine 1.

In step SA4, when the command to perform the counting process is not input (NO is selected), the flow proceeds to step SA6. In step SA6, whether the dispensing process is properly finished without rejecting the banknotes is determined. When the process is properly finished (YES is selected), the flow is finished. When the process is not properly finished (NO is selected), the flow returns to step SA2 to perform the dispensing process again.

In step SA4, when the command to perform the counting process is input (YES is selected), the flow proceeds to step SA5 to perform the counting process.

(Counting Process after Dispensing Process)

Figure 11:
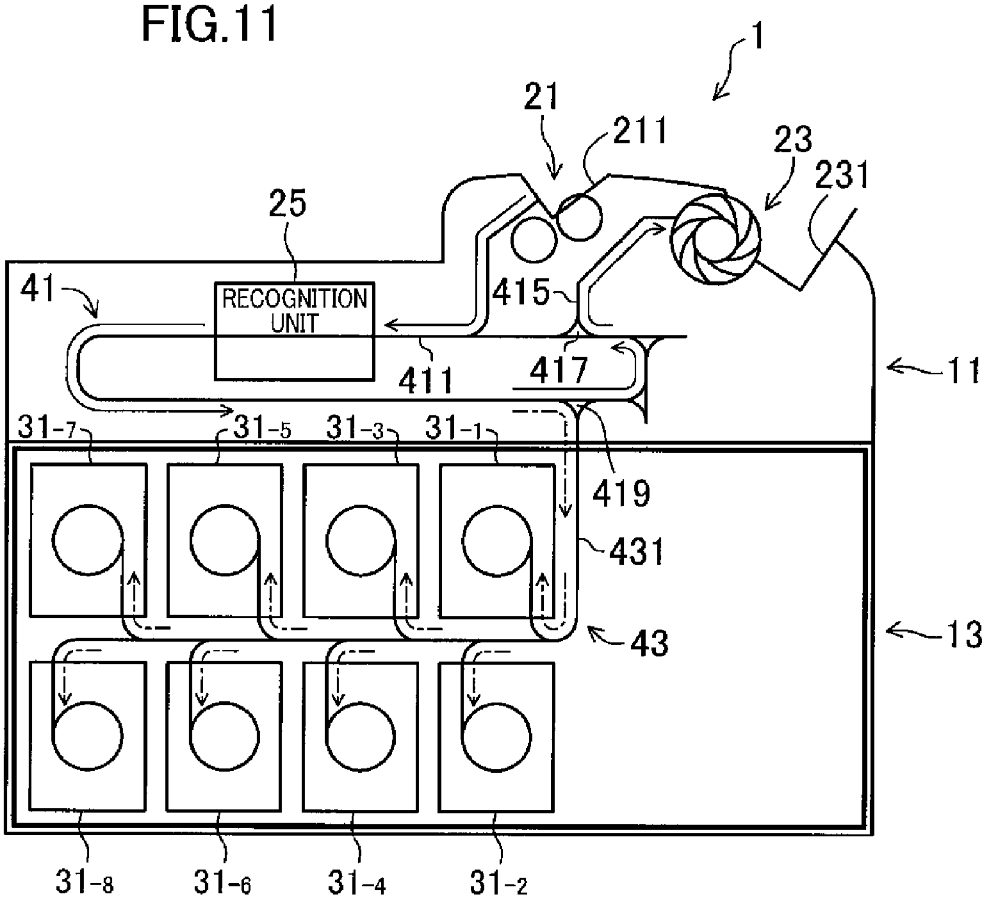
FIG. 11 shows a transport path for transporting the banknotes in a counting process.

The counting process after the dispensing process is started when the operator places every banknote dispensed to the outlet 231 (containing both the rejected banknotes and the normal banknotes) in the inlet 211, and performs predetermined operation to start the counting process. As shown in FIG. 11, the feeding mechanism of the depositing unit 21 feeds the banknotes in the inlet 211 one by one, and the upper transport unit 41 transports the banknotes to the recognition unit 25. The recognition unit 25 recognizes and counts the banknotes. The upper transport unit 41 transports the banknotes that have passed the recognition unit 25 to the dispensing path 415 through the looped transport path 411 and the diverter 417 as indicated by solid arrows in FIG. 11. Thus, every banknote is dispensed again to the outlet 231. The result of the counting process is displayed on the higher-ranking machine and/or the display unit 511 to inform the operator of the result.

Since the depositing/dispensing machine 1 performs the counting process after the dispensing process, there is no need for the operator to manually count the banknotes, thereby reducing the load on the operator. Further, since the depositing/dispensing machine 1 which performs the dispensing process can perform the counting process sequentially after the dispensing process, the operator's work is simplified, thereby further reducing the load on the operator. The depositing/dispensing machine 1 which can perform both of the dispensing process and the counting process can advantageously store the history and track the log.

The results of the counting process are displayed on the higher-ranking machine or the display unit 511 as described above. The operator can be informed of the number of the banknotes dispensed in the dispensing process. Thus, the operator can manually determine the inventory amount in the storage unit 3 after the dispensing process. Alternatively, the inventory amount in the storage unit 3 of the depositing/dispensing machine 1 may automatically be determined based on the results of the counting process. Specifically, the results of the counting process are the numbers of the banknotes of different denominations dispensed in the dispensing process which requires the counting process. Thus, the inventory amount after the dispensing process can be determined by subtracting the results of the counting process from the inventory amount before the dispensing process.

When one or more banknotes are rejected in the counting process, information about the rejected banknotes (denomination and number) may manually be input by the operator, and the memory 59 stores the information. Then, the inventory amount of the depositing/dispensing machine 1 can be determined based on the results of the counting process and the information about the rejected banknotes stored in the memory 59.

When one or more banknotes are rejected in the dispensing process, the counting process and the reconciliation process may be performed so that the results of the counting process and the results of the reconciliation process can be checked against the inventory amount in the storage unit 3 before the dispensing process. In this configuration, when some of the banknotes escape from the inlet 211 in moving the banknotes from the outlet 231 to the inlet 211 to start the counting process after the dispensing process, the missing of some of the banknotes can be recognized. Specifically, the banknotes can more suitably be handled even when the banknotes are rejected in the dispensing process.

The reconciliation process may be a normal reconciliation process in which every banknote stored in the storage module 31 is fed, or may be the above-described partial reconciliation process.

When the banknotes are rejected in the dispensing process, a command to perform the dispensing process may be input before proceeding to the counting process to properly finish the dispensing process, thereby quickly finishing the operator's work at the window. The counting process may be performed after the dispensing process is normally finished. In this case, the banknotes dispensed to the outlet 231 (containing both of the rejected banknotes and the normal banknotes) can separately be kept until the counting process is started.

When the operator performs the counting process, the results of the counting process are manually input to associate the counting results with the log of the dispensing process which requires the counting process stored in the memory 59, thereby determining the inventory amount after the dispensing process. When the operator performs the counting process, the depositing/dispensing machine 1 does not need to perform the counting process. Thus, when the operator manually inputs the counting results, the machine 1 does not need to go into standby for the counting process. When the memory 59 stores a plurality of logs of the dispensing process which requires the counting process, the operator can manually select the log of the dispensing process with which the counting results are associated in inputting the results.

In the counting process after the dispensing process, the fit banknotes which can be stored in the storage unit 3 may be stored in the storage modules 31 as indicated by dot-and-dash arrows in FIG. 11. This allows effective use of the banknotes in the depositing/dispensing machine 1.

In the above-described configuration, the operator manually starts the counting process after the dispensing process is finished (step SA4 in FIG. 10). However, the counting process can automatically be started after the dispensing process.

In performing the partial dispensing process, the counting process may be performed after all the banknotes are dispensed. Alternatively, the dispensing process may be suspended when the banknotes containing the rejected banknotes are dispensed, and then the counting process may be started. In this case, the dispensing process is restarted after the counting process is finished.

In the counting process after the dispensing process (in this specification, "after the dispensing process" may include the case where the dispensing process is suspended), the banknotes may merely be counted instead of recognizing and counting the banknotes. As long as the number of the banknotes fed from the depositing/dispensing machine 1 and the result of the counting process (the number of the banknotes) coincide with each other, the process.

When the depositing/dispensing machine 1 is provided with the escrow unit 51 as shown in FIG. 5, the banknotes rejected in the dispensing process may be stored in the escrow unit 51. In this configuration, the dispensing process can properly and quickly be finished by feeding only the normal banknotes to the outlet 231, and then the rejected banknotes stored in the escrow unit 51 may be counted. The rejected banknotes stored in the escrow unit 51 may be dispensed to the outlet 231 after the normal banknotes dispensed in the dispensing process are removed from the outlet 231, and then the rejected banknotes may be placed in the inlet 211 to perform the counting process. The inventory amount in the storage module 31 may manually or automatically be updated based on the count of the rejected banknotes. In particular, when the rejected banknotes are still unrecognizable, the operator may manually update the inventory amount in the storage module 31.

The depositing/dispensing machine to which the disclosed technology is applicable is not limited to the depositing/dispensing machine placed in the teller counter. For example, the disclosed technology may be applied to a depositing/dispensing machine for depositing the amount of sales of a shop etc.

The disclosed technology is not limited to the depositing/dispensing machine for depositing/dispensing the banknotes, but may be applied to a dispensing machine for dispensing the banknotes contained therein. Further, the disclosed technology is not limited to the depositing/dispensing machine for depositing/dispensing the banknotes, but may be applied to a coin depositing/dispensing machine, a coin depositing machine, a banknote/coin depositing/dispensing machine, or a banknote/coin depositing machine.

As described above, the banknote handling apparatus disclosed herein is useful in that the time necessary for a reconciliation process can be reduced.

What is claimed is:

1. A banknote handling apparatus configured to handle banknotes, comprising:

a first storage unit configured to store the banknotes by winding the banknotes and a tape on a reel, and feed the stored banknotes;

a second storage unit configured to store and feed the banknotes;

a transport unit configured to transport the banknotes between the first storage unit and the second storage unit;

a recognition unit configured to recognize the banknotes during transport by the transport unit; and a control unit configured to allow the banknotes in the first storage unit to be fed and stored in the second storage unit, and thereafter allow the banknotes stored in the second storage unit to be fed and stored in the first storage unit, and recognized by the recognition unit, in order to perform a reconciliation process for determining an inventory amount in the first storage unit, wherein when the banknotes are stored in the first storage unit, the control unit allows the banknotes to be provided with a mark associated with inventory amount information of the first storage unit while the banknotes are being stored in the first storage unit, to perform the reconciliation process, the control unit allows some of the banknotes stored in the first storage unit to be fed from the first storage unit, based on the mark, for recognition by the recognition unit, and determines an inventory amount in the first storage unit based on a result of the recognition and the inventory amount information associated with the mark, the first storage unit stores the banknotes by winding the banknotes on the reel, with a predetermined gap between adjacent ones of the banknotes, and the mark is provided between transactions in which the banknotes are stored in the first storage unit, and the mark is an interval larger than the predetermined gap.

2. A banknote handling apparatus configured to handle banknotes, comprising:

a first storage unit configured to store the banknotes by winding the banknotes and a tape on a reel, and feed the stored banknotes;

a second storage unit configured to store and feed the banknotes;

a transport unit configured to transport the banknotes between the first storage unit and the second storage unit;

a recognition unit configured to recognize the banknotes during transport by the transport unit;

a control unit configured to allow the banknotes in the first storage unit to be fed and stored in the second storage unit, and thereafter allow the banknotes stored in the second storage unit to be fed and stored in the first storage unit, and recognized by the recognition unit, in order to perform a reconciliation process for determining an inventory amount in the first storage unit; and a reading unit configured to read a unique code provided on each of the banknotes to be stored in the first storage unit, wherein when the banknotes are stored in the first storage unit, the control unit allows the banknotes to be provided with a mark associated with inventory amount information of the first storage unit while the banknotes are being stored in the first storage unit, to perform the reconciliation process, the control unit allows some of the banknotes stored in the first storage unit to be fed from the first storage unit, based on the mark, for recognition by the recognition unit, and determines an inventory amount in the first storage unit based on a result of the recognition and the inventory amount information associated with the mark, and the mark is the code of the banknote to be stored in the first storage unit.

3. A banknote handling apparatus configured to handle banknotes, comprising:

a first storage unit configured to store the banknotes by winding the banknotes and a tape on a reel, and feed the stored banknotes;

a second storage unit configured to store and feed the banknotes;

a transport unit configured to transport the banknotes between the first storage unit and the second storage unit;

a recognition unit configured to recognize the banknotes during transport by the transport unit; and a control unit configured to allow the banknotes in the first storage unit to be fed and stored in the second storage unit, and thereafter allow the banknotes stored in the second storage unit to be fed and stored in the first storage unit, and recognized by the recognition unit, in order to perform a reconciliation process for determining an inventory amount in the first storage unit, wherein when the banknotes are stored in the first storage unit, the control unit allows the banknotes to be provided with a mark associated with inventory amount information of the first storage unit while the banknotes are being stored in the first storage unit, to perform the reconciliation process, the control unit allows some of the banknotes stored in the first storage unit to be fed from the first storage unit, based on the mark, for recognition by the recognition unit, and determines an inventory amount in the first storage unit based on a result of the recognition and the inventory amount information associated with the mark, and the mark is a position on the tape which is specified by a lengthwise position on the tape in the first storage unit.

4. The banknote handling apparatus of claim 1, further comprising:

a reading unit configured to read a unique code provided on each of the banknotes to be stored in the first storage unit, wherein the mark is the code of the banknote to be stored in the first storage unit.

5. The banknote handling apparatus of claim 1, wherein the mark is a position on the tape which is specified by a lengthwise position on the tape in the first storage unit.

6. The banknote handling apparatus of claim 2, wherein the mark is a position on the tape which is specified by a lengthwise position on the tape in the first storage unit.

* * * * *